United States Patent
Cordatos et al.

(10) Patent No.: US 10,364,040 B2
(45) Date of Patent: Jul. 30, 2019

(54) AIR SEPARATION SYSTEM FOR FUEL STABILIZATION

(71) Applicant: HAMILTON SUNDSTRAND CORPORATION, Windsor Locks, CT (US)

(72) Inventors: Haralambos Cordatos, Colchester, CT (US); Jonathan Rheaume, West Hartford, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 12 days.

(21) Appl. No.: 15/338,578

(22) Filed: Oct. 31, 2016

(65) Prior Publication Data

US 2018/0118366 A1    May 3, 2018

(51) Int. Cl.

| B01D 53/22 | (2006.01) |
|---|---|
| B64D 37/32 | (2006.01) |
| B01D 19/00 | (2006.01) |
| B01D 53/30 | (2006.01) |
| B64D 37/02 | (2006.01) |
| B64D 37/00 | (2006.01) |
| B64D 37/34 | (2006.01) |

(52) U.S. Cl.
CPC .......... *B64D 37/32* (2013.01); *B01D 19/0005* (2013.01); *B01D 53/22* (2013.01); *B01D 53/30* (2013.01); *B64D 37/00* (2013.01); *B64D 37/02* (2013.01); *B64D 37/34* (2013.01); *B01D 2053/221* (2013.01)

(58) Field of Classification Search
CPC .... B01D 53/30; B01D 53/22; B01D 19/0005; B01D 2053/221; B64D 37/32; B64D 37/02

See application file for complete search history.

(56) References Cited

U.S. PATENT DOCUMENTS

| 2,845,383 | A | 7/1958 | Bowles, Jr. et al. |
|---|---|---|---|
| 3,590,559 | A | 7/1971 | Bragg et al. |
| 3,672,180 | A | 6/1972 | Davis |
| 3,710,549 | A | 1/1973 | Nichols et al. |
| 3,732,668 | A | 5/1973 | Nichols |

(Continued)

FOREIGN PATENT DOCUMENTS

| DE | 4225170 A1 | 2/1994 |
|---|---|---|
| DE | 102013100803 A1 | 7/2014 |

(Continued)

OTHER PUBLICATIONS

EP Communication; EP Extended Search Report Application No. 17170089.1-1659; dated Oct. 12, 2017, pp. 1-8.

(Continued)

*Primary Examiner* — Anthony R Shumate
(74) *Attorney, Agent, or Firm* — Cantor Colburn LLP

(57) ABSTRACT

A system for generating inert gas includes a source of pressurized air. An air separation module including at least one permeable membrane is operable to separate the pressurized air into oxygen-enriched air and inert gas-enriched air. A fuel tank containing a fuel is arranged downstream from said air separation module. The inert gas-enriched air output from said air separation module interacts with said fuel to remove dissolved oxygen from said fuel.

20 Claims, 5 Drawing Sheets

(56) References Cited

U.S. PATENT DOCUMENTS

| | | | |
|---|---|---|---|
| 3,788,039 | A | 1/1974 | Bragg |
| 3,847,298 | A | 11/1974 | Hamilton |
| 4,681,602 | A | 7/1987 | Glenn et al. |
| 5,220,799 | A | 6/1993 | Lievens et al. |
| 5,255,735 | A | 10/1993 | Raghava et al. |
| 5,782,188 | A | 7/1998 | Evans et al. |
| 5,843,212 | A | 12/1998 | Nanaji |
| 6,012,533 | A | 1/2000 | Cramer |
| 6,315,815 | B1 | 11/2001 | Spadaccini et al. |
| 6,432,169 | B1 | 8/2002 | Kluwe et al. |
| 6,440,317 | B1* | 8/2002 | Koethe ............ B01D 17/0217 210/774 |
| 6,578,639 | B1 | 6/2003 | Osime et al. |
| 6,705,092 | B1 | 3/2004 | Zhou et al. |
| 6,729,359 | B2 | 5/2004 | Jones |
| 6,840,292 | B2 | 1/2005 | Hart et al. |
| 7,204,868 | B2* | 4/2007 | Snow, Jr. ................ A62C 3/06 96/135 |
| 7,459,081 | B2 | 12/2008 | Koenig et al. |
| 7,517,388 | B2 | 4/2009 | Jensvold |
| 7,595,019 | B2 | 9/2009 | Cutler et al. |
| 7,628,965 | B2 | 12/2009 | Johnson |
| 7,694,916 | B2 | 4/2010 | Limaye et al. |
| 7,896,292 | B2 | 3/2011 | Limaye |
| 7,905,259 | B2 | 3/2011 | Johnson |
| 8,192,532 | B1* | 6/2012 | Gupta ................... B64D 37/32 244/129.2 |
| 8,245,978 | B1 | 8/2012 | Beers et al. |
| 8,388,740 | B2 | 3/2013 | Sohn et al. |
| 8,499,567 | B2 | 8/2013 | Hagh |
| 8,602,362 | B2 | 12/2013 | Buchwald |
| 8,763,712 | B2 | 7/2014 | Kotliar |
| 8,801,831 | B1 | 8/2014 | Snow, Jr. et al. |
| 8,813,860 | B2 | 8/2014 | Bleil et al. |
| 8,882,886 | B2 | 11/2014 | Evosevich et al. |
| 8,904,669 | B2 | 12/2014 | Tichborne et al. |
| 8,925,865 | B2 | 1/2015 | Stolte et al. |
| 8,950,703 | B2 | 2/2015 | Bayliss et al. |
| 9,016,078 | B2 | 4/2015 | Gupta |
| 9,096,326 | B2 | 8/2015 | Dooley et al. |
| 9,114,886 | B2 | 8/2015 | Gupta |
| 9,118,054 | B2 | 8/2015 | Gummalla et al. |
| 9,120,571 | B2 | 9/2015 | Kshirsagar et al. |
| 9,174,740 | B2 | 11/2015 | Stolte et al. |
| 9,186,622 | B1 | 11/2015 | Ranjan et al. |
| 9,216,931 | B1 | 12/2015 | Su |
| 9,340,297 | B2 | 5/2016 | Cao |
| 9,511,874 | B2 | 12/2016 | Tiger |
| 9,623,981 | B2 | 4/2017 | Darling et al. |
| 9,687,773 | B2 | 6/2017 | Johnson et al. |
| 2002/0152889 | A1 | 10/2002 | Baker et al. |
| 2002/0160240 | A1 | 10/2002 | Matsui et al. |
| 2003/0196645 | A1 | 10/2003 | Kojima et al. |
| 2004/0226438 | A1* | 11/2004 | Jones ................... B01D 53/22 95/45 |
| 2005/0048334 | A1 | 3/2005 | Sridhar et al. |
| 2005/0247197 | A1 | 11/2005 | Snow, Jr. |
| 2006/0011063 | A1 | 1/2006 | Zhou |
| 2006/0113248 | A1 | 6/2006 | Koenig et al. |
| 2007/0039464 | A1 | 2/2007 | Vanderhoof et al. |
| 2008/0128048 | A1 | 6/2008 | Johnson et al. |
| 2008/0176174 | A1 | 7/2008 | White et al. |
| 2009/0227195 | A1* | 9/2009 | Buelow ................. B01D 53/88 454/156 |
| 2009/0321090 | A1 | 12/2009 | Bleil et al. |
| 2009/0325014 | A1 | 12/2009 | Newkirk |
| 2010/0006048 | A1 | 1/2010 | Minty et al. |
| 2010/0107877 | A1 | 5/2010 | Suzuki et al. |
| 2010/0155315 | A1 | 6/2010 | Partridge et al. |
| 2010/0252005 | A1 | 10/2010 | Kitamoto et al. |
| 2011/0003224 | A1 | 1/2011 | Scheibert |
| 2011/0014536 | A1 | 1/2011 | Yoshida |
| 2011/0262309 | A1 | 10/2011 | Limaye |
| 2012/0035406 | A1 | 2/2012 | Lam et al. |
| 2012/0210747 | A1 | 8/2012 | Hoffjann et al. |
| 2012/0292058 | A1 | 11/2012 | Bleil et al. |
| 2012/0325811 | A1 | 12/2012 | Hagh et al. |
| 2013/0071594 | A1 | 3/2013 | Bikson et al. |
| 2013/0098314 | A1 | 4/2013 | Imran et al. |
| 2013/0168111 | A1 | 7/2013 | Wong et al. |
| 2013/0214464 | A1 | 8/2013 | Lancho Doncel |
| 2013/0312743 | A1* | 11/2013 | Kshirsagar ............ B64D 11/00 128/202.26 |
| 2014/0150649 | A1 | 6/2014 | Stolte et al. |
| 2014/0208943 | A1* | 7/2014 | Gupta ................... B64D 37/32 95/14 |
| 2014/0251426 | A1 | 9/2014 | Bando et al. |
| 2014/0252171 | A1 | 9/2014 | Dooley et al. |
| 2014/0272659 | A1 | 9/2014 | Lu et al. |
| 2015/0000523 | A1 | 1/2015 | Jojic et al. |
| 2015/0132214 | A1 | 5/2015 | Eickhoff |
| 2015/0217153 | A1 | 8/2015 | Jones |
| 2015/0344146 | A1 | 12/2015 | Theodore et al. |
| 2015/0349356 | A1 | 12/2015 | Ribarov et al. |
| 2015/0353201 | A1 | 12/2015 | Hagh et al. |
| 2016/0030781 | A1 | 2/2016 | Hoffjann et al. |
| 2016/0052639 | A1 | 2/2016 | Burnell et al. |
| 2016/0064751 | A1 | 3/2016 | Hoffjann et al. |
| 2016/0102261 | A1 | 4/2016 | Lam et al. |
| 2016/0102032 | A1 | 5/2016 | Du et al. |
| 2016/0167802 | A1 | 6/2016 | Lo et al. |
| 2016/0176535 | A1* | 6/2016 | Family .................. B64D 37/32 701/3 |
| 2016/0257419 | A1* | 9/2016 | Artaud ..................... A62C 3/08 |
| 2016/0361684 | A1 | 12/2016 | Ranjan et al. |
| 2017/0122275 | A1 | 5/2017 | Ishimitsu et al. |
| 2017/0145969 | A1 | 5/2017 | Ishimitsu et al. |
| 2017/0167036 | A1 | 6/2017 | Tew et al. |
| 2017/0331131 | A1 | 11/2017 | Rheaume |
| 2017/0341019 | A1 | 11/2017 | Rheaume |
| 2017/0368496 | A1 | 12/2017 | Rheaume et al. |
| 2018/0016025 | A1 | 1/2018 | Rheaume et al. |
| 2018/0118367 | A1 | 5/2018 | Rheaume |
| 2018/0127110 | A1 | 5/2018 | Cordatos et al. |

FOREIGN PATENT DOCUMENTS

| | | |
|---|---|---|
| EP | 3023518 A1 | 5/2016 |
| EP | 3260373 A1 | 12/2017 |
| EP | 3320954 A1 | 5/2018 |
| GB | 1395691 | 5/1975 |
| WO | 9635634 A1 | 11/1996 |
| WO | 2011117610 A1 | 9/2011 |

OTHER PUBLICATIONS

EP Communication; Extended European Search Report; Application No. 17199034.4-1010; dated Jan. 10, 2018; pp. 1-19.

EP Communication; Extended European Search Report; Application No. 17199212.6-1010; dated Jan. 12, 2018; pp. 1-15.

Woodford, et al., "Heat exchangers," pp. 1-7; Jan. 17, 2016; https://web.archive.org/web/20161030205435/http://www.explainthatstuff.com/how-heat-exchangers-work.html.

Non-Final Office Action for U.S. Appl. No. 15/192,692, filed Jun. 24, 2016; Fuel Tank System and Method; dated Nov. 16, 2017; pp. 1-14.

Non-Final Office Action for U.S. Appl. No. 15/348,287, filed Nov. 10, 2016; On-Board Aircraft Reactive Inerting Dried Gas System; dated Feb. 9, 2018; pp. 1-37.

Partial Search Report regarding related EP Application No. 17171470.2; dated Nov. 30, 2017; 16 pgs.

Perry, et al., "Perrys-Chemical-Engineers-handbook" McGraw-Hill, 7th Ed., 1999, p. 22-64.

Search Report regarding related EP Application No. 17170089.1; dated Oct. 12, 2017; 8 pgs.

Search Report regarding related EP Application No. 17177967.1; dated Nov. 23, 2017; 8 pgs.

W. Balster, et al., "Effects of Temerature on Formation of Insolubles in Aviation Fuels," The American Society of Mechanical Engineers,

(56) References Cited

OTHER PUBLICATIONS

Presented a tthe Internationa Gas Turbine and Aeroengine Congress & Exhibition, Orlando, FL—Jun. 2-Jun. 5, 1997, pp. 1-6.
European Search Report issued in EP Application No. 17171470 dated Mar. 6, 2018, 5 pages.
Extended European Search Report issued in EP Application No. 17200886 dated Mar. 14, 2018, 10 pages.
Notice of Allowance for U.S. Appl. No. 15/169,165, filed May 31, 2016; On-Board Vehicle Inert Gas Generation System; dated Jan. 10, 2019; pp. 1-32.

\* cited by examiner

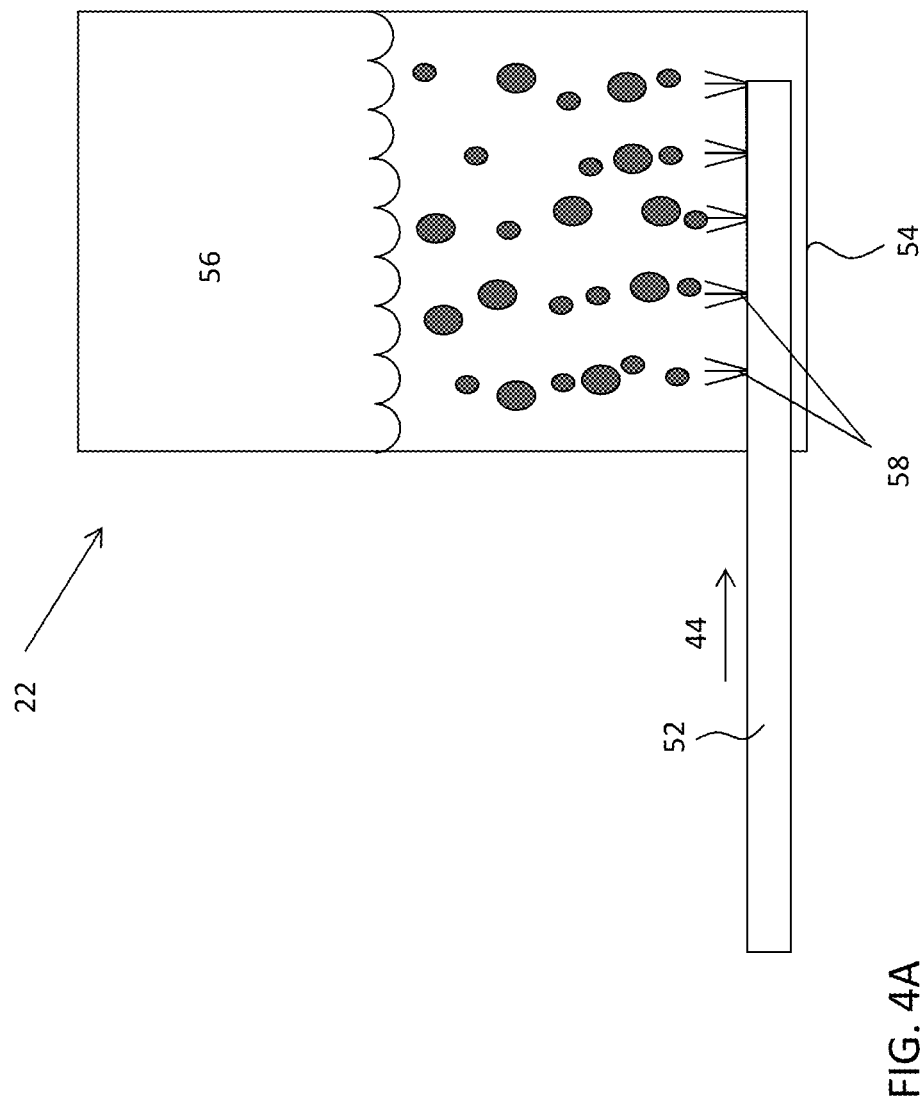

AIR SEPARATION SYSTEM FOR FUEL STABILIZATION

BACKGROUND OF THE INVENTION

This invention generally relates to the aircraft on-board systems, and more particularly, to a fuel stabilization system.

On-board Inert Gas Generating Systems (OBIGGS) are used to introduce an inert gas into the fuel tanks of a vehicle, such as an aircraft. The inert gas displaces potentially dangerous fuel and air mixtures, thereby reducing the risk of explosion or fire. Further, the dissolved oxygen within the fuel may react with fuel and form solids that block the flow of fuel along the fuel passage and that foul heat exchange surfaces. Typically, OBIGGS process air from an air source, such as bleed air taken from the engines of an aircraft. A deoxygenated air is typically generated by separating oxygen from local, ambient air and pumping the deoxygenated air into the ullage of the tank.

BRIEF DESCRIPTION OF THE INVENTION

According to one embodiment, a system for generating inert gas includes a source of pressurized air. An air separation module including at least one permeable membrane is operable to separate the pressurized air into oxygen-enriched air and inert gas-enriched air. A fuel tank containing a fuel is arranged downstream from said air separation module. The inert gas-enriched air output from said air separation module interacts with said fuel to remove dissolved oxygen from said fuel.

According to another embodiment, a method of eliminating the formation of solid deposits from fuel includes providing pressurized air to an air separation module. The pressurized air is separated into an oxygen-enriched air and an inert gas-enriched air. The inert gas-enriched air and the fuel are arranged in direct contact to remove dissolved oxygen from the fuel.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4A is a schematic diagram of an outlet conduit for supplying inert gas-enriched air to a fuel tank according to an embodiment.

DETAILED DESCRIPTION OF THE INVENTION

Figure 1:
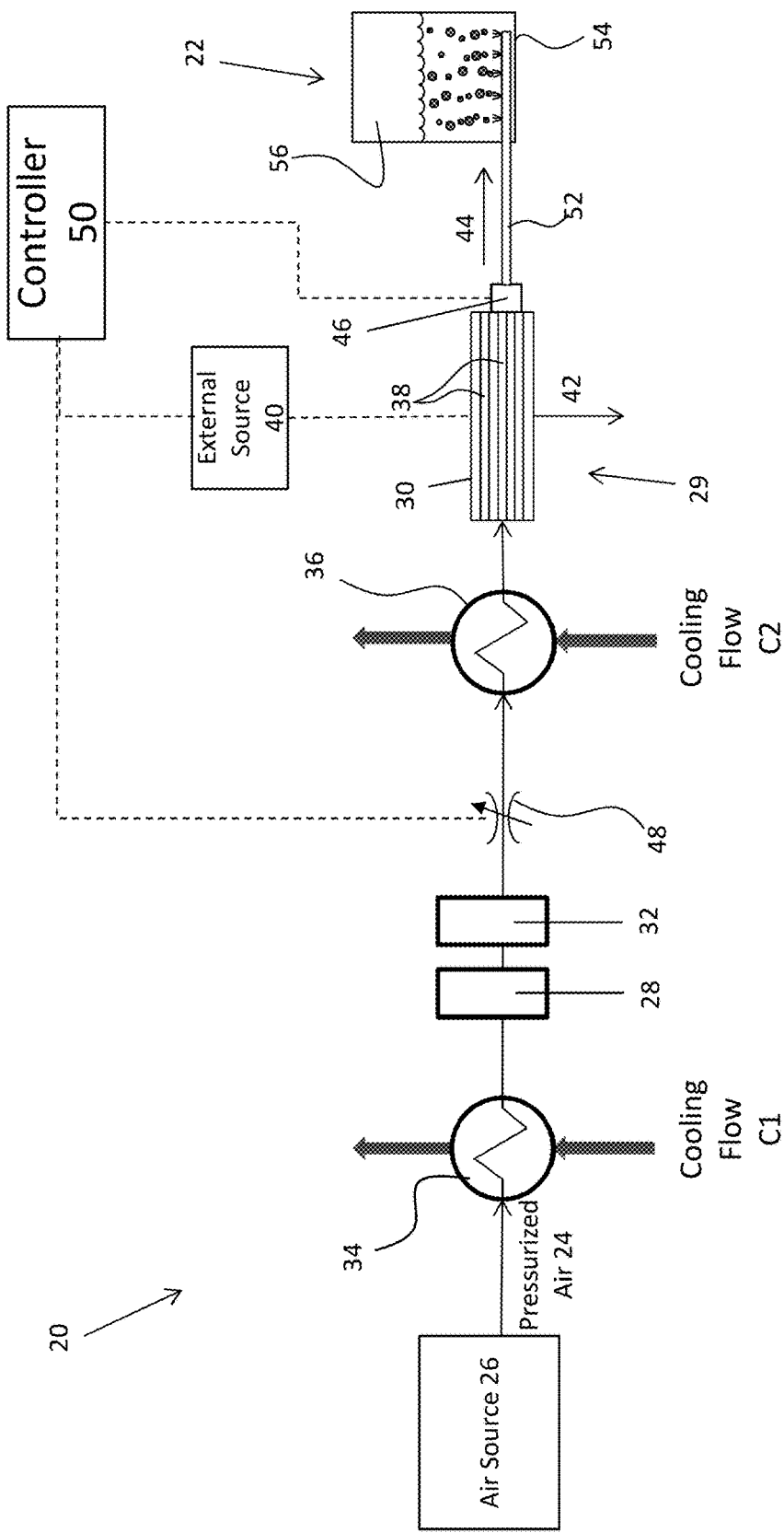
FIG. 1 is a schematic diagram of an On-board Inert Gas Generating System according to an embodiment.

Referring now to the FIGS., an example of a system for 20 for generating and supplying a source of inert gas to another component, such as a fuel tank 22 for example, is illustrated. The system 20 includes a supply of air 24 provided from a pressurized air source 26 which is used to generate the inerting gas. In the illustrated, non-limiting embodiment, the pressurized air source 26 includes one or more engines, such as of an aircraft for example. In such embodiments, the pressurized air 24 may be bled from a compressor section of the engine. However, embodiments where the pressurized air source 26 is not an engine are also contemplated herein. For example, in the non-limiting embodiment illustrated in FIG. 3, the pressurized air source 26 includes a compressor configured to pressurize ambient air as it passes there through. The compressor 25 may be driven by a mechanical, pneumatic, hydraulic, or electrical input.

Within the system 20, the pressurized air 24 may flow through a filter, illustrated schematically at 28, before being provided to an on-board inert gas generating system (OBIGGS) 29 including at least one air separation module (ASM) 30 for removing oxygen from the air 24. The filter 28 may comprise one or more filters, such as a coalescing filter to remove particulate contaminants and moisture, and a carbon filter for removing hydrocarbons from the supply of pressurized air 24. Alternatively, or in addition, the pressurized air 24 may pass through an ozone conversion means 32 configured to reduce the ozone concentration of the air before being provided to the OBIGGS 29. Although the filter 28 is illustrated as being upstream of the ozone conversion means 32, embodiments where the filter 28 is located downstream of the ozone conversion means 32 are also contemplated herein. Further, it should be understood that both the filter 28 and ozone conversion means 32 may be located at any relative position within the system 20, upstream from the OBIGGS 29.

The temperature of the pressurized air 24 should be below a maximum allowable temperature to maintain the safety of the downstream components, as well as the safety of the fuel tank 22. Because the pressurized air 24 from the pressurized air source 26 is generally extremely hot, the pressurized air 24 is typically cooled before being processed. Accordingly, one or more cooling devices, such as heat exchangers for example, may be used to control the temperature of the bleed air within the system 20 before being provided to the OBIGGS 29 and/or the fuel tank 22. In the illustrated, non-limiting embodiment of FIG. 1, system 20 includes a precooler 34 that arranges the pressurized air 24 in a heat transfer relationship with a secondary cooling flow C1, such as fan bypass air from the pressurized air source 26 for example. Within the precooler 34, the air 24 may be reduced to a temperature less than or equal to about 200° C. The system 20 may additionally include an ASM cooling heat exchanger 36 configured to further cool the pressurized air 24. In an embodiment, a secondary cooling flow C2, such as ambient air (ram air for example), is arranged in a heat transfer relationship with the pressurized air 24 within the ASM cooling heat exchanger 36 and is configured to reduce the air 24 to a desired temperature, for example less than or equal to about 25° C. at sea level on a standard day.

In certain embodiments, the ambient airflow used as the secondary cooling flow C2 can be directed within the aircraft body by a NACA scoop, etc. In certain embodiments, the secondary cooling flow C2 is conditioned air from an environmental control system of the aircraft. In certain embodiments, the secondary cooling flow C2 can be cooled by an air cycle machine such as an environmental control system of the aircraft. In certain embodiments, the secondary cooling flow C2 utilizes a vapor cycle machine for cooling. In certain embodiments, the secondary cooling flow C2 can be a fuselage outflow to utilize airflow from within a passenger cabin, cargo hold, or flight deck of the aircraft. In certain embodiments, the secondary cooling flow C2 can be fan bleed air from an engine of the aircraft. In certain embodiments, the secondary cooling flow C2 can be a combination or hybrid of the airflow sources described herein. In certain embodiments, airflow sources can be selectively provided and combined to provide a desired secondary cooling flow C2.

Figure 2:
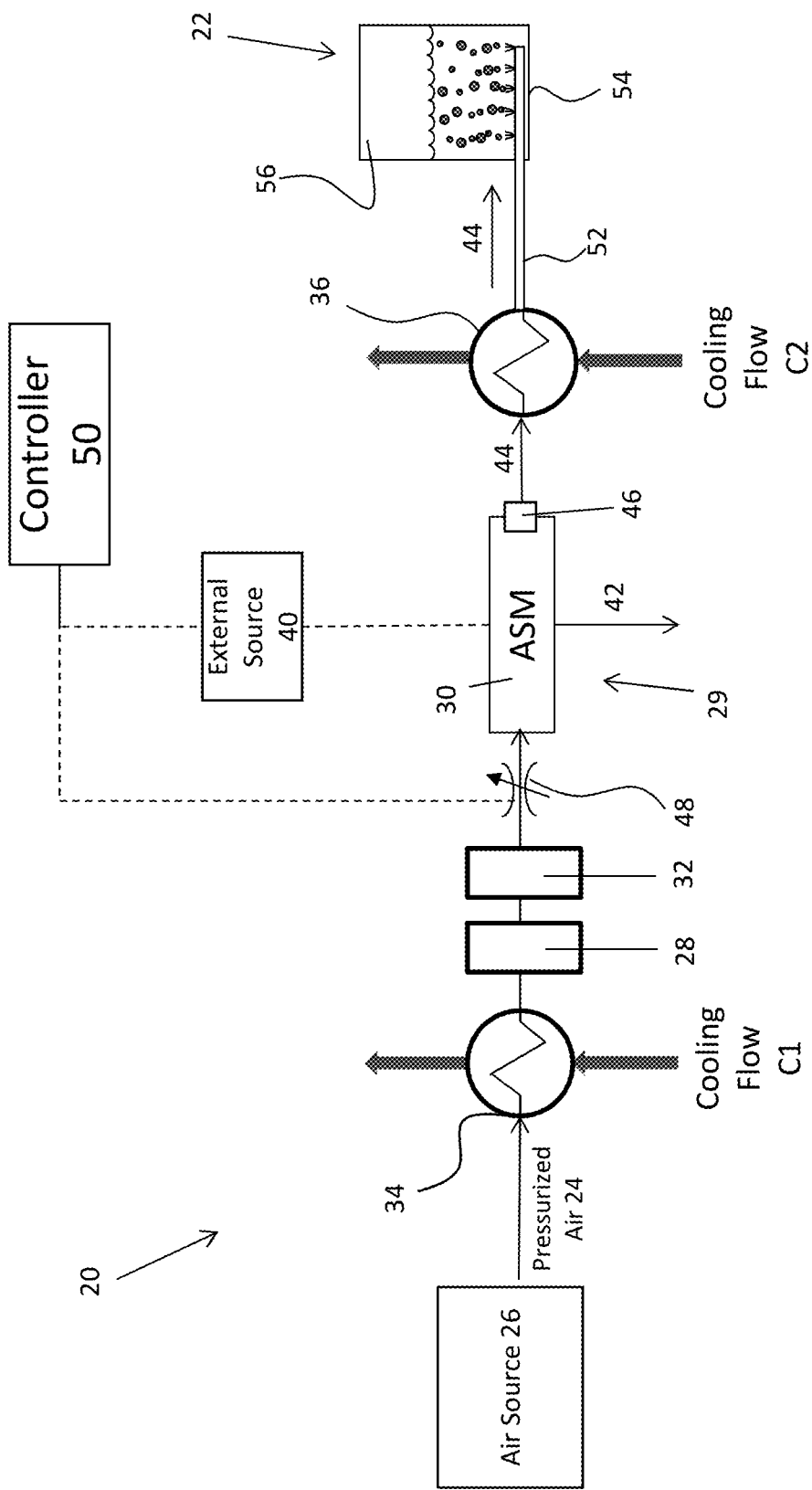
FIG. 2 is a schematic diagram of another an On-board Inert Gas Generating System according to an embodiment.
Figure 3:
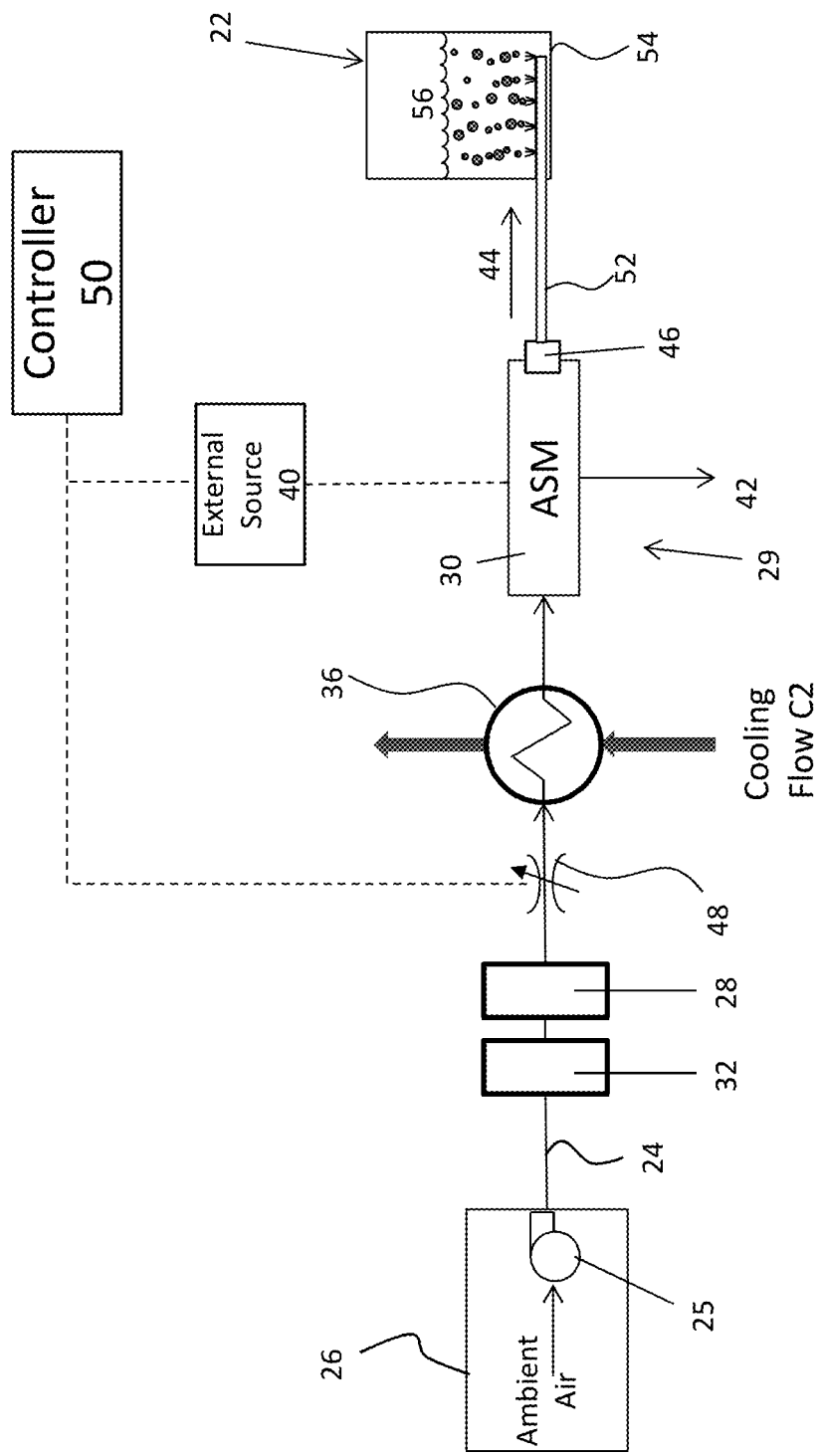
FIG. 3 is a schematic diagram of yet another On-board Inert Gas Generating System according to an embodiment.

As shown in FIG. 1, both the precooler 34 and the ASM cooling heat exchanger 36 are located upstream from the ASM 30. However, the separation efficiency of the ASM 30 is directly dependent on the temperature of the air 24 provided thereto. Therefore, the size of the ASM 30 and/or the pressure within the ASM 30 may be reduced by supplying pressurized air 24 having a higher temperature to the ASM 30. In an embodiment, one or more of the cooling devices 34, 36 may be located downstream from the ASM 30. With reference to FIG. 2 for example, the precooler 34 is disposed upstream of the ASM 30 and the ASM cooling heat exchanger 36 is arranged downstream from the ASM 30 such that the air provided to the ASM cooling heat exchanger 36 has a reduced oxygen content. It should be understood that the configuration of the one of more cooling devices 34, 36 is dependent on the temperature of the pressurized air 24 provided to the OBIGGS 29, the suitable temperature of the air for introduction to the fuel tank 22, and the overall configuration of the cooling device. For example, because the pressurized air 24 output from the compressor 25 in the system of FIG. 3 is less than 200° C., the precooler 34 may be eliminated. Accordingly, embodiments having any number of cooling devices, including only one cooling device, or no cooling device are also contemplated herein.

The ASM(s) 30 of the OBIGGS 29 typically includes one or more permeable membranes 38. The size, specifically the surface area, of the permeable membranes 38 may vary based on desired performance characteristics of the OBIGGS 29. The pressurized air 24 is configured to pass across a first side of the membrane 38 creating a pressure differential across the membrane 38. The membrane selectively transports oxygen and water vapor more favorably than nitrogen. The permeate gases act as a secondary fluid on a second, opposite side of the membrane 38. In some embodiments, a supplementary secondary fluid, such as a sweep gas for example, is configured to pass over a second, opposite side of the membrane 38 to improve the performance of the ASM 30. The supplementary secondary fluid flow may be provided from any suitable system having a low pressure flow. In an embodiment, the secondary fluid flow is assisted by an external source 40, such as vacuum source for example, operably coupled to the at least one ASM 30. However, it should be understood that the supplementary secondary fluid is not necessary for operation of the OBIGGS 29.

Examples of the permeable membranes 38 include membranes that selectively allow faster transport of smaller molecules compared to larger nitrogen molecules in air. Such membranes typically rely on molecule size-selective tortuous paths through a non-porous polymer matrix in the form of a thin film deposited onto a microporous layer. Selective materials that may be used for forming such membranes 38 include polysulfones, polyimides, cellulose acetates, or polycarbonate materials for example. The membranes 38 can include any of these materials, alone or in combination with each other or other suitable selective materials. Combinations of different materials can be integrated into a single membrane structure (e.g., in layers, or zones in the x-y plane of a membrane structure), or can be disposed in series or in parallel as separate membrane structures or modules. Further, the membranes may have any suitable configuration, including but not limited to flat sheet, non-planar, spiral wound and hollow fiber for example. However, it should be understood that the configurations of the permeable membrane 38 described herein are intended as an example only and any suitable membrane configuration is within the scope of the disclosure.

The pressure differential between the pressurized air 24 and the secondary fluid causes oxygen to be transported from the pressurized air 24 to the secondary fluid stream thereby separating the pressurized air 24 into an oxygen-enriched permeate 42 and an inert gas-enriched (oxygen-depleted) air 44, also referred to as retentate. Accordingly, the magnitude of the pressure differential may be used, in part, to control how much oxygen is diffused from the stream of pressurized pressurized air 24. Oxygen-enriched, and in some embodiments, water-enriched air permeate 42 is released from the ASM 30 to the ambient atmosphere, and the inert gas-enriched air 44 is directed to one or more systems of an aircraft, such as the fuel tank 22 or to a fire suppression system (not shown) of the aircraft for example.

In an embodiment, a backpressure regulator 46 is associated with the ASM 30 to ensure that a pressure necessary for operation of the ASM 30 is continuously maintained therein. Alternatively or in addition, a flow control device 48, such as a valve for example, configured to control the flow of pressurized air 24 through the system 20 may be disposed at any location along the fluid flow path between the source 26 of the pressurized air 24 and a final destination of the inert gas. In embodiments including the compressor 25, the flow control device may include a variable speed motor associated with the compressor 25. Although the flow control device 48 is illustrated as being disposed upstream of the ASM 30 in each of the embodiments, systems 20 where the flow control device 48 is arranged downstream from the ASM 30 are also contemplated herein.

A controller 50 may be operably coupled to one or more of the components of the system 20. For example, the controller 50 may be configured to operate the flow control device 48 to control the flow rate of pressurized air 24 through the system 20. In addition, the controller 50 may be associated with the external source 40, to initiate and terminate the secondary fluid within the ASM 30. In embodiments where the system 20 includes one or more sensors (not shown), such as an oxygen sensor for measuring the amount of oxygen in the air 44 provided to the fuel tank 22, or a sensor for monitoring one or more conditions associated with the fuel tank 22, such as a flow rate, quantity of fuel, and fuel demand for example, the controller 50 is configured to receive an output from the sensor and adjust one or more operating conditions of the system 20 in response to that output.

The inert gas-enriched air 44 output from the ASM 30 is used to stabilize the fuel within the fuel tank 22 by removing dissolved oxygen therefrom. In such embodiments, the inert gas-enriched air 44 output from the ASM 30 is an inert gas having an oxygen content of less than about 18% by volume, and more specifically less than about 12%, less than about 10%, less than about 5%, and less than about 2% by volume. The inert gas described herein is generally referred to as nitrogen; however, it should be understood that the inert gas may contain other species in lower concentrations. In an embodiment, the air 44 output from the ASM 30 should maintain this level of less than 2% oxygen by volume during all flight conditions of the aircraft, and in particular during descent which is the period of highest inert gas demand. Alternatively or in addition, the ullage of the fuel tank 22 may be preloaded with highly oxygen-depleted inert gas prior to or during descent of an aircraft such that an inrush of outside air does not cause the oxygen concentration to exceed a desired threshold.

The deoxygenated air output from an ASM 30 in a conventional system during descent is typically around about 12% for a commercial aircraft application and about 9% for a military aircraft application. To achieve this greater separation compared to conventional systems, the membranes 38 of the ASM 30 may have a greater surface area as previously described. Alternatively, or in addition, the ASM 30 may be operated at elevated conditions, such as a higher temperature and pressure for example, because the membranes 38 deoxygenate better under such elevated conditions. Elevated conditions include, but are not limited to, a temperature greater than about 80° C. and/or a pressure of greater than about 4 bar. However, operation at such elevated conditions may affect the lifetime of the permeable membranes 38 of the ASM 30.

Figure 4B:
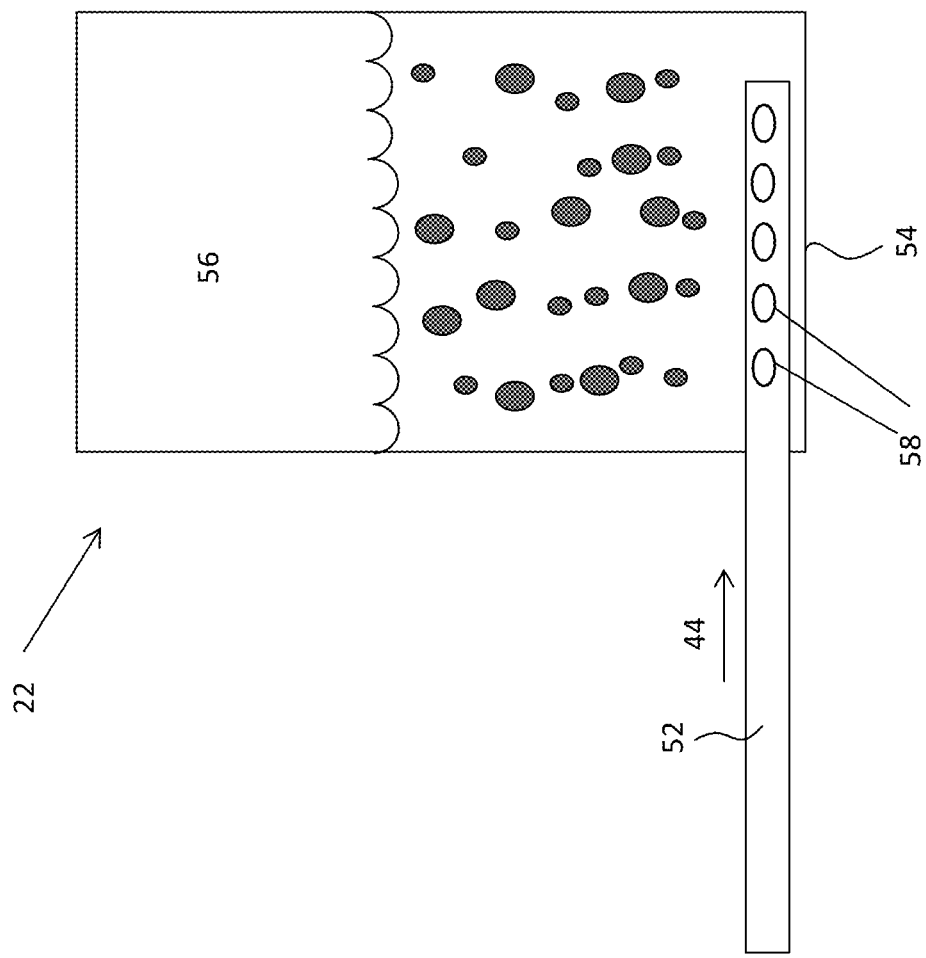
FIG. 4B is a schematic diagram of another outlet conduit for supplying inert gas-enriched air to a fuel tank according to an embodiment.

In an embodiment, stabilization of the fuel of fuel tank 22 is performed via a sparging operation. However, other methods of stabilizing the fuel by interacting the fuel with an inert gas-enriched air are also contemplated herein. To sparge the fuel tank 22, an outlet conduit 52 extends from the ASM 30 or another upstream component, such as the ASM heat exchanger 36 for example, into the interior of the fuel tank 22. The outlet conduit 52 is positioned such that the outlet conduit 52 is generally immersed within the fuel within tank 22. In some embodiments, maneuvers of the aircraft may cause outlet conduit 52 to be not immersed in which case a plurality of outlet conduits 52 may be co-located in the same tank 22 in various orientations and spatial locations with provisions to switch flow of inert gas-enriched air 44 between the plurality of outlet conduits 52. As a result, the inert gas-enriched air 44 interacts directly with the fuel, rather than being provided to the ullage 56 of the fuel tank 22. The outlet conduit 52 may include ports or nozzles 58, as shown in FIG. 4A, and/or pores or orifices 60 (FIG. 4B) of a suitable size for injecting the inert gas 44 into the fuel, thereby creating a bubbling effect, as illustrated. The bubbles of inert gas-enriched air 44 will rise toward the ullage 56, with a portion of the inert gas-enriched air 44 being dissolved into the fuel. In the illustrated, non-limiting embodiment, the outlet conduit 52 has a generally horizontal orientation relative to the bottom surface 54 of the fuel tank 22. However, other configurations are also within the scope of the disclosure.

By supplying the inert gas-enriched air 44 to the fuel, the content of dissolved inert gas in the fuel is increased and the content of dissolved oxygen is decreased according to Henry's Law. Therefore, the injection of the inert gas bubbles into the fuel exposes the liquid fuel to a higher partial pressure of inert gas such as nitrogen and a considerably lower partial pressure of oxygen resulting in oxygen leaving the fuel. The system 20 is therefore effectively used to remove the dissolved oxygen in the fuel and to introduce inert gas.

In embodiments where the inert gas-enriched air 44 is intended for use in sparging the fuel tank 22, the temperature of the air 44 provided to the fuel tank 22 must be lower than the 80° C. typically required in a normal fuel tank inerting system. This reduced temperature is necessary to avoid vaporizing the volatile fractions of the fuel within the fuel tank 22. In an embodiment, the temperature of the air 44 provided to the fuel tank 22 is less than the boiling point of the lightest volatile fraction commonly found in the fuel to avoid fractioning the fuel and changing the fuel composition. However, volatile fractions that would typically boil off during a standard day should be excluded when determining the maximum allowable temperature of the air 44. In an embodiment, the inert gas-enriched air 44 is provided to the fuel tank 22 at a temperature of less than or equal to about 25° C. at sea level on a standard day. However, it should be understood that the boiling point of the volatile is dependent on the altitude of the aircraft, and accordingly, the maximum allowable temperature of the inert gas-enriched air will similarly vary.

Alternatively, the temperature of the air 44 provided to the fuel tank 22 may be greater than the boiling point of the lightest volatile fraction commonly found in the fuel. For example, at altitude when fuel is exposed to cold temperatures over a protracted duration (a condition commonly referred to as "cold soak"), the temperature of the inert gas can be increased beyond the boiling point of the lightest fractions in order to transfer heat from the inert gases to the fuel. This action may help avoid problems associated with ice formation and with wax crystal formation in cold fuel. Excessive heating of the fuel, however, can lead to the evaporation and boiling of fuel species (fractional distillation). In such embodiments, the fractions that boil off can be recovered by passing the ullage gases that contain fuel vapors through a reverse selective membrane as disclosed, for example, in U.S. patent application Ser. No. 15/192,692, filed on Jun. 24, 2016, the entire disclosure of which is incorporated herein by reference.

In embodiments where the system 20 includes both a precooler 34 and an ASM cooling heat exchanger 36, the ASM cooling heat exchanger 36 and the precooler 34 may vary in size in order to achieve the desired temperature of pressurized air into ASM 30 and to achieve the desired temperature of air 44 into fuel tank 22. Alternatively, or in addition, the pressurized air 24 or the inert gas-enriched air 44 may be cooled using a vapor cycle machine or an air cycle machine, such as typically included as a component of an environmental control system (ECS) of an aircraft. In such embodiments, heat may be rejected to the ECS by cooling with gases operable as the working fluid in the air cycle process, or the air 44 may be expanded using an air cycle machine. In an embodiment, the ASM cooling heat exchanger 36 is located in the ram air duct such that the ASM cooling heat exchanger 36 is the first heat exchanger within the duct in order to cool process gases to a desired temperature.

By using the ASM 30 to generate a sparging gas supply on board an aircraft, fuel stabilization is enabled, thereby allowing fuel within a fuel tank to absorb more heat than currently possible without deposit formation. Further, because the sparging gases passivate the ullage of the fuel tank 22, a separate fuel tank inerting system is not necessary. In addition, the system 20 not only removes water from the fuel, but also addresses known problems of bacterial growth, freezing, and fuel degradation of conventional systems. Although the system 20 is illustrated and described herein with respect to an aircraft, it should be understood that such a system may be adapted for use in a variety of applications including motor vehicle and marine applications for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for generating inert gas comprising:
a source of pressurized air for generating a pressurized air flow;
an air separation module located downstream from and in fluid communication with said source of pressurized air, said air separation module including at least one permeable membrane operable to separate said pressurized air into an oxygen-enriched air and an inert gas-enriched air, said oxygen-enriched air being separate from said inert gas-enriched air;
a backpressure regulator for continuously maintaining an operational pressure within the air separation module;
a fuel tank containing a fuel, the fuel tank being arranged downstream from said air separation module; and
a conduit for delivering said inert gas-enriched air from said air separation module to said fuel tank, a portion of said conduit being immersed within said fuel of said fuel tank such that said inert gas-enriched air delivered to said fuel tank interacts directly with said fuel to remove dissolved oxygen from said fuel.

2. The system according to claim 1, wherein said interaction of said inert gas-enriched air with said fuel performs a fuel inerting operation.

3. The system according to claim 2, wherein said dissolved oxygen is removed from said fuel and said fuel inerting operation occur simultaneously.

4. The system according to claim 1, wherein said source of pressurized air includes air that is pressurized within a compressor.

5. The system according to claim 4, wherein said source of pressurized air includes air bled from an engine.

6. The system according to claim 1, wherein said inert gas-enriched air has less than 2% oxygen by volume.

7. The system according to claim 1, wherein said inert gas-enriched air is provided to said fuel at a temperature less than a boiling point of a lightest volatile fraction of said fuel.

8. The system according to claim 1, wherein said temperature of said inert gas-enriched air provided to said fuel is less than or equal to about 25° C. at sea level.

9. The system according to claim 1, further comprising at least one cooling device for reducing a temperature of said pressurized air or said inert gas-enriched air.

10. The system according to claim 9, wherein said at least one cooling device is disposed upstream from said air separation module.

11. The system according to claim 9, wherein said at least one cooling device is disposed downstream from said air separation module.

12. The system according to claim 1, further comprising at least one of a filter and an ozone converter positioned upstream from said air separation module.

13. The system according to claim 1, further comprising:
a flow control device; and
a controller operably coupled to said flow control device, wherein said controller adjusts the flow control device to control said pressurized air flow.

14. The system according to claim 13, further comprising at least one sensor for monitoring a condition of the air separation module, the at least one sensor being operably coupled to said controller such that said controller adjusts said flow control device in response to an output from said at least one sensor.

15. The system according to claim 1, wherein said conduit includes a plurality of ports such that said inert gas-enriched air is provided to said fuel as a plurality of bubbles.

16. A method of eliminating the formation of solid deposits from fuel, comprising:
providing pressurized air to an air separation module;
continuously maintaining an operational pressure within the air separation module via a backpressure regulator;
separating said pressurized air into an oxygen-enriched air and an inert gas-enriched air by removing oxygen from a portion of said pressurized air, said oxygen-enriched air and said inert gas-enriched air being output from said air separation module separately; and
supplying said inert gas-enriched air directly to fuel within a fuel tank to remove dissolved oxygen from the fuel via a conduit at least partially immersed within the fuel.

17. The method according to claim 16, wherein the fuel is arranged within a fuel tank, and arranging said inert gas-enriched air in direct contact with the fuel simultaneously removes dissolved oxygen from the fuel and inerts said fuel tank.

18. The method according to claim 16, wherein the fuel is stabilized via a sparging operation.

19. The method according to claim 16, wherein said inert gas-enriched air includes less than 2% oxygen by volume.

20. The method according to claim 16, wherein said inert gas-enriched air is supplied to said fuel at a temperature less than or equal to about 25° C. at sea level.

* * * * *